(No Model.)
J. J. B. FREY.
WATER CLOSET.
No. 260,965.  Patented July 11, 1882.
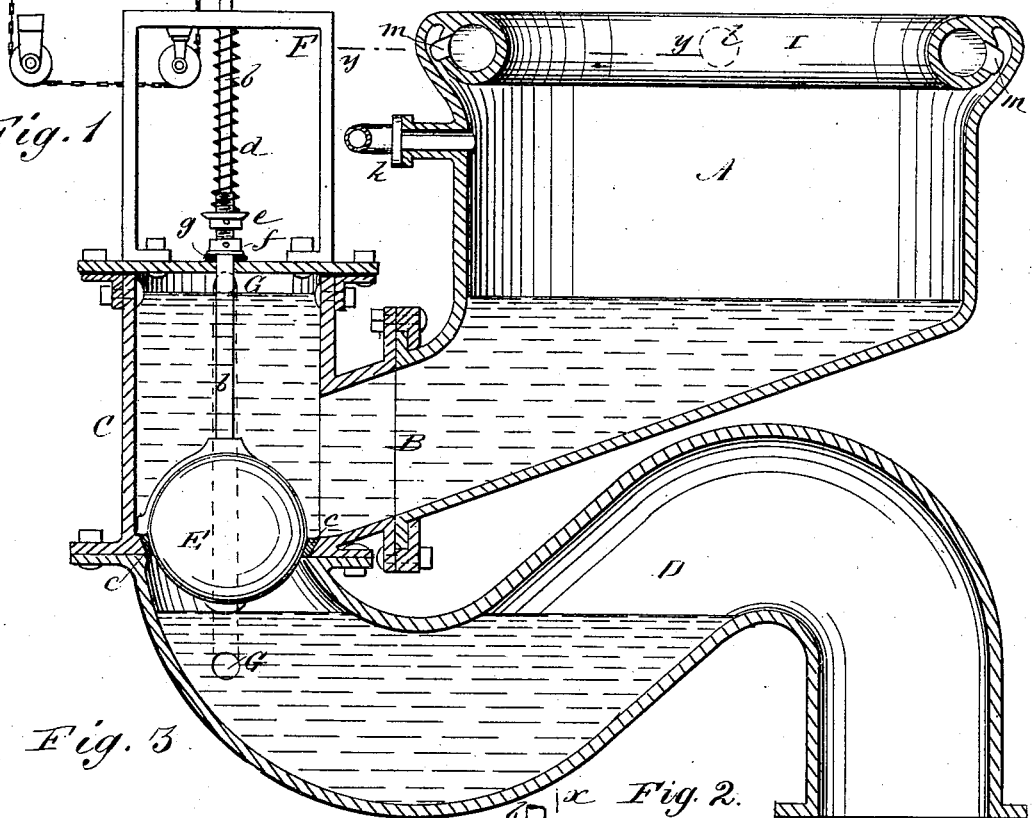
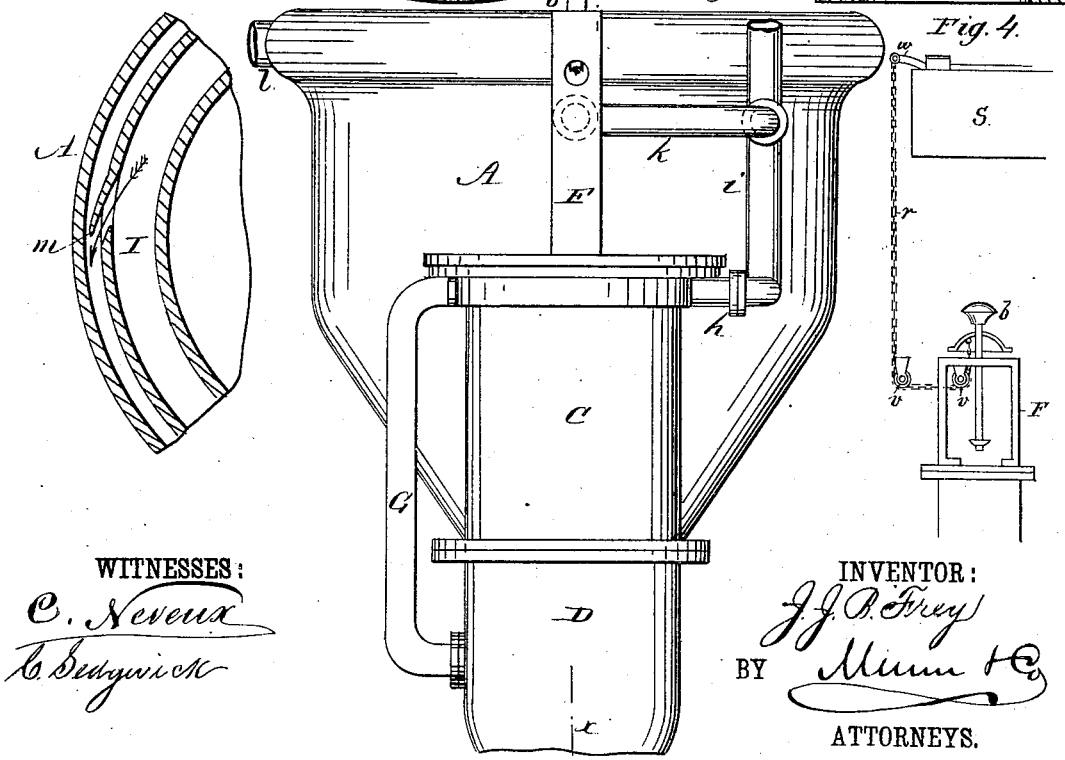
WITNESSES:
C. Neveux
C. Sedgwick
INVENTOR:
J. J. B. Frey
BY Munn & Co.
ATTORNEYS.

UNITED STATES PATENT OFFICE.

JOSEPH J. B. FREY, OF NEW YORK, N. Y.

WATER-CLOSET.

SPECIFICATION forming part of Letters Patent No. 260,965, dated July 11, 1882.

Application filed March 31, 1882. (No model.)

*To all whom it may concern:*

Be it known that I, JOSEPH J. B. FREY, of the city, county, and State of New York, have invented certain new and useful Improvements in Water-Closets, of which the following is a full, clear, and exact description.

Reference is to be had to the accompanying drawings, forming part of this specification, in which similar letters of reference indicate corresponding parts in all the figures.

Figure 1 represents a vertical section on the line $x$ $x$ in Fig. 2 of a water-closet constructed in accordance with my invention. Fig. 2 is a side or end view of the same in a plane at right angles to Fig. 1. Fig. 3 is a horizontal section through the flushing-rim of the bowl on the line $y$ $y$ in Fig. 1. Fig. 4 is a view upon a diminished scale, showing the connection of the pull-rod with the lever by which the valve in the cistern is operated.

This invention consists in certain novel constructions and combinations of parts, whereby a most thorough ventilation is provided for the closet; communication with the trap or soil-pipe is shut off by a water-sealed and closely-constructed valve, thus preventing the escape of noxious gases; an overflow is provided alike for the bowl and the valve-chamber; and great compactness, simplicity, and efficiency generally are obtained, substantially as hereinafter described.

In the drawings, which represent a cistern-closet that operates on what has been termed the "side-outlet" principle, A indicates the bowl, which, as well as the delivery duct or channel B therefrom and the side chamber, C, with which said duct connects, may, if desired, all be made of porcelain. The chamber C is mounted on the trap D, and extends above the duct B, as in other side-outlet closets; but, instead of being fitted (as is frequently customary in such closets) with a hollow plunger that is in open communication at its bottom with the trap, and permits of the escape of noxious gases from the trap and soil-pipe up through it into the upper portion of said chamber, from whence they are liable to escape into the building or foul the water in said chamber, I attach to the lower end of the pull-rod $b$, by which the water from the cistern above is let onto the closet, and by which the discharge is controlled from the bowl, a light ball-valve, E, of rubber, or it may be a weighted one. This valve, when down or closed, rests closely upon a brass or other seat, $c$, at the end of the duct B and bottom of the chamber C, which may be directly above or at the receiving end of the trap. Said ball-valve E does not permit of the escape of any noxious gases through it from the trap and soil-pipe, but when closed forms a complete bar to any passage of gas from the trap either through or around it. It is kept firmly seated, either by means of its weight, by a separate weight applied thereto, or by a spring, $d$, arranged around the pull-rod $b$. Upon raising the pull-rod $b$ to discharge water from the cistern S, which may be done (see Fig. 4) by means of a chain, $r$, arranged to pass under pulleys $v$ $v$, and connecting the pull-rod $b$ or projection thereon with the lever $w$ of the cistern-valve, thereby dispensing with an additional lever attached directly to the pull-rod, fresh water is supplied to the bowl A, and the valve E is lifted or opened to pass off the soiled water and excrement. The spring $d$, which has its upper bearing against the top piece of a frame, F, has its tension made adjustable, so as to act with more or less power by means of a screw-nut, $e$, on the pull-rod $b$ at the lower end of said spring. To insure the proper and close fit of the valve E on its seat when closed, and to provide for wear of said valve on its seat, I arrange on the rod $b$ a second screw-nut, $f$, below the nut $e$. This nut $f$, when the pull-rod is down, bears, under the indirect action of the spring $d$, down upon a rubber or other elastic cushion, $g$, which yields to admit the valve E to come close to its seat, and at the same time, by its arrangement on top of the cover-plate of the chamber C, makes the opening through said plate for the pull-rod air-tight. The nuts $e$ and $f$, when adjusted as required, may be held or locked in position by set-screws passing through their sides and bearing on the pull-rod.

By making the valve E in whole or in part a hollow rubber one, its softness and elasticity, combined with the elasticity of the spring $d$ on the pull-rod, prevent any jarring or breaking of the joints of the closet or injury to or breakage of the side chamber, C.

Connecting the upper portion of the chamber

C above the duct B, and at or immediately above the level at which the water stands in said chamber, and also with the trap D at a point below the valve E, is an overflow-pipe, G, arranged on the outside of said chamber and connected therewith by suitable couplings or joints that will readily admit of its removal when required for cleaning or other purposes.

The service-box of the cistern should be of such capacity that every time water is drawn from it a supply will be furnished sufficiently copious to flood the chamber C and cause the surplus to pass off by the overflow-pipe G, thus making said chamber at all times a clear water one and insuring a supply of fresh water above the valve E. Furthermore the chamber C is kept constantly ventilated by connecting its upper space immediately above the level of the water-line therein by an outside branch, $h$, with a vent-pipe, $i$, leading to or above the roof of the building or elsewhere. This, in connecting with the overflow-pipe G, makes a direct vent from the trap below the shut-off valve or ball E to the roof, thereby effectually ventilating the chamber C. An additional vent-branch, $k$, on the outside of the bowl A, also connects the upper portion of said bowl with the vent-pipe $i$. In this way a thorough ventilation is effected both of the bowl and its side chamber, and in case of any flooding of the bowl by accident the bowl-vent $k$ will act as an overflow to the vent-pipe $i$, from thence to the chamber C, and finally by the overflow-pipe G to the trap. The double vents $h$ and $k$, which both connect with the main vent or draft-pipe $i$, will serve to pass off noxious gases rising from the trap or soil-pipe, even in case water should fail to be supplied from the cistern and the shut-off valve E should fail to close tight. In a regular way and when a proper quantity of water is supplied to the closet the overflow will be from the bowl A down the duct B to the chamber C, and from thence through the overflow pipe or branch G.

The flushing-rim I of the bowl, which may be of any suitable construction, is here represented as formed by an annular tubular construction of the interior upper portion of the bowl. This rim I is supplied with water from the cistern at an opening, $l$, in its side, which water travels through it in a circular direction and is forcibly and directly ejected from it by a series of oblique or curved jet apertures or nozzles, $m$, having a more or less tangential position relatively to the rim.

Having thus fully described my invention, I claim as new and desire to secure by Letters Patent—

1. The combination, with the side chamber of a side-outlet water-closet, the pull-rod by which the admission of water is controlled to said closet, and a valve on said rod constructed and arranged to close the lower discharge-opening in said chamber, of a nut or projection on said rod outside of said chamber and a yielding cushion with which said projection is brought in contact when said valve is closed, essentially as and for the purpose herein set forth.

2. The combination, with the side chamber and pull-rod, having an attached valve for closing the lower discharge-opening in said chamber, of the spring $b$, the adjustable nuts $e\ f$, and the yielding cushion $g$, whereby provision is made for regulating the tension of said spring and for independently adjusting the closing action of said valve as controlled by said spring and cushion $g$, substantially as specified.

3. The valve E, of ball shape, and made of rubber, in combination with the side chamber, C, the pull-rod $b$, and the adjustable spring $d$, essentially as described.

4. The combination of the bowl A and its attached vent pipe or branch $k$ with the upward vent-pipe, $i$, the vent-branch $h$, the side chamber, C, and the overflow-pipe G, whereby not only is provision made for ventilating both the bowl and side chamber, but an overflow for surplus water is provided from the bowl and side chamber, or either, substantially as described.

JOS. J. B. FREY.

Witnesses:
A. GREGORY,
C. SEDGWICK.